(12) United States Patent
Skrabak et al.

(10) Patent No.: US 11,479,074 B2
(45) Date of Patent: Oct. 25, 2022

(54) METHOD AND DEVICE FOR CONTROLLING THE RIDE LEVEL FOR A VEHICLE AND VEHICLE

(71) Applicant: KNORR-BREMSE SYSTEME FUER NUTZFAHRZEUGE GMBH, Munich (DE)

(72) Inventors: Attila Skrabak, Budapest (HU); Peter Csontos, Budapest (HU); Oliver Udvardy, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 474 days.

(21) Appl. No.: 16/497,044

(22) PCT Filed: Mar. 21, 2018

(86) PCT No.: PCT/EP2018/057162
§ 371 (c)(1),
(2) Date: Sep. 24, 2019

(87) PCT Pub. No.: WO2018/177838
PCT Pub. Date: Oct. 4, 2018

(65) Prior Publication Data
US 2020/0376913 A1    Dec. 3, 2020

(30) Foreign Application Priority Data

Mar. 27, 2017  (DE) .......................... 102017106523.7

(51) Int. Cl.
*B60G 17/0195*  (2006.01)
*B60G 11/27*  (2006.01)
(Continued)

(52) U.S. Cl.
CPC .......... *B60G 17/0195* (2013.01); *B60G 11/27* (2013.01); *B60T 1/005* (2013.01);
(Continued)

(58) Field of Classification Search
CPC ................ B60G 17/0195; B60G 11/27; B60G 2202/15; B60G 2500/202; B60T 1/005;
(Continued)

(56) References Cited

U.S. PATENT DOCUMENTS

| 2014/0041973 A1* | 2/2014 | Zula ...................... B60T 13/662 |
| | | 188/106 P |
| 2014/0054118 A1* | 2/2014 | Rogers .................. B60T 13/683 |
| | | 188/170 |

(Continued)

FOREIGN PATENT DOCUMENTS

| DE | 19648174 A1 | 5/1998 |
| DE | 102005061479 A1 | 5/2007 |

(Continued)

OTHER PUBLICATIONS

International Search Report dated Jun. 19, 2018, of the corresponding International Application PCT/EP2018/057162 filed Jul. 3, 2018.

*Primary Examiner* — Toan C To
(74) *Attorney, Agent, or Firm* — Norton Rose Fulbright US LLP; Gerard Messina

(57) ABSTRACT

A method, apparatus and vehicle for controlling a ride level for a vehicle having at least one first axle having a first air suspension and/or one second axle having a second air suspension, a parking brake and an operating brake, including: reading a ride level variation signal, indicating a ride level variation to be performed; providing a parking break release signal to an interface to a parking brake valve that, responding to the ride level variation signal, releases and (Continued)

engages the parking brake installation, the parking brake release signal being for actuating the parking brake valve for releasing the parking brake installation; and providing a first control signal to an interface to a first valve of the first air suspension and/or a second control signal to an interface to a second valve of the second air suspension while using the ride level variation signal for performing the ride level variation.

6 Claims, 3 Drawing Sheets

(51) Int. Cl.
    *B60T 1/00*       (2006.01)
    *B60T 7/12*       (2006.01)
    *B60W 10/18*     (2012.01)
    *B60W 10/22*     (2006.01)

(52) U.S. Cl.
    CPC .............. *B60T 7/12* (2013.01); *B60W 10/182* (2013.01); *B60W 10/22* (2013.01); *B60G 2202/15* (2013.01); *B60G 2500/202* (2013.01); *B60T 2260/06* (2013.01); *B60W 2710/188* (2013.01); *B60W 2710/22* (2013.01)

(58) Field of Classification Search
    CPC .... B60T 7/12; B60T 2260/06; B60W 10/182; B60W 10/22; B60W 2710/188; B60W 2710/22
    See application file for complete search history.

(56) References Cited

U.S. PATENT DOCUMENTS

| | | | |
|---|---|---|---|
| 2017/0120711 A1* | 5/2017 | Albers | B60G 17/017 |
| 2018/0312018 A1* | 11/2018 | Wilson | B60C 23/00336 |
| 2020/0096128 A1* | 3/2020 | Cervantez | F16K 17/06 |
| 2021/0170999 A1* | 6/2021 | Hutchins | B60T 7/122 |
| 2021/0171001 A1* | 6/2021 | Lein | B60T 8/1708 |

FOREIGN PATENT DOCUMENTS

| | | | | |
|---|---|---|---|---|
| DE | 102014013744 B3 | | 10/2015 | |
| DE | 102019103661 A1 | * | 8/2020 | ............. B60T 13/36 |
| EP | 1800916 B1 | | 6/2007 | |
| EP | 2631095 A1 | | 8/2013 | |
| GB | 2184405 A | | 6/1987 | |
| GB | 2499651 A | * | 8/2013 | ......... B60G 17/0195 |
| JP | 2008137423 A | | 6/2008 | |
| WO | 2016046067 A1 | | 3/2016 | |

* cited by examiner

METHOD AND DEVICE FOR CONTROLLING THE RIDE LEVEL FOR A VEHICLE AND VEHICLE

FIELD OF THE INVENTION

The present invention relates to a method and to a device for controlling the ride level for a vehicle, and to a vehicle having an air suspension.

BACKGROUND INFORMATION

The air suspension of a vehicle can be used for controlling the ride level, thus for controlling a height of the body above ground.

SUMMARY OF THE INVENTION

Against this background, it is an object of the present invention to achieve an improved method and an improved device for controlling the ride level for a vehicle, and an improved vehicle.

This object may be achieved by a method and a device for controlling the ride level for a vehicle, and by a vehicle according to the independent claims.

On account of the approach described, a parking brake valve which is in any case present in a vehicle and which is provided for releasing as well as for engaging a parking brake of the vehicle can advantageously be used for controlling the ride level so as to release the wheels of at least one axle of the vehicle. On account thereof, the wheels of said axle can roll such that a variation of the spacing of the axles of the vehicle resulting by virtue of the controlling of the ride level can be equalized.

A method for controlling the ride level for a vehicle having at least one first axle having a first air suspension and/or one second axle having a second air suspension, a parking brake installation and an operating brake installation comprises the following steps:

reading a ride level variation signal which indicates a ride level variation to be carried out;

providing a parking brake release signal to an interface to a parking brake valve that, responding to the ride level variation signal, is configured for releasing and engaging the parking brake installation, wherein the parking brake release signal is configured for actuating the parking brake valve for releasing the parking brake installation; and providing a first control signal to interface to a first valve of the first air suspension and/or a second control signal to an interface to a second valve of the second air suspension while using the ride level variation signal for carrying out the ride level variation.

The vehicle can be, for example, a commercial vehicle, for example a truck, or a vehicle for transporting passengers. An air suspension can comprise at least one air suspension bellows by way of which an axle of the vehicle can be coupled to the body of the vehicle. A desired springing and damping behavior of the air suspension as well as a desired spacing between the axle and the body can be set by a corresponding charge or discharge of air to or from the air suspension bellows. If an air suspension is provided on only one axle, a suspension of another type, for example a steel spring, can thus be provided on the other axle. The parking brake installation can be configured for preventing the vehicle from rolling away in the parked state. To this end, the parking brake installation on the first axle as well as on the second axle can have at least one parking brake for engaging at least one of the wheels assigned to the respective axle. The parking brake valve can be configured for engaging the parking brake installation when the vehicle is parked, and for releasing said parking brake installation when the vehicle is travelling, on the one hand, and can be configured for releasing the parking brake installation when the ride level variation is being carried out, on the other hand. The operating brake installation can be used for decelerating the vehicle while travelling. To this end, the operating brake installation on the first axle as well as on the second axle can have at least one operating brake for braking at least one wheel assigned to the respective axle. The parking brake and the operating brake of one wheel herein can be embodied so as to be separate or combined, for example using one and the same brake disc.

The method can comprise a step of providing an operating brake engagement signal to an interface to the operating brake installation. The step of providing can take place in a manner responding to the ride level variation signal. The operating brake engagement signal herein can be configured for effecting an engagement of an operating brake of the operating brake installation that is assigned to the first axle and/or the second axle. Rolling away of the vehicle can be prevented in this way when the parking brake installation is released while changing the ride level.

For example, in the step of reading the ride level variation signal can be read by way of an interface to a control apparatus of an electronic ride level control system (ELC). If a corresponding system is provided for electronic ride level control, a signal that typically is anyway determined by the electronic ride level control system can advantageously be used for actuating the parking brake installation and optionally the operating brake installation.

In the step of providing the parking brake release signal the parking brake release signal can be provided while using a control apparatus of an electronic parking brake (EBB). In this way, an electronic parking brake system can advantageously be used for implementing the concept described.

In the step of providing the operating brake engagement signal the operating brake engagement signal can be provided while using a control apparatus of an electronic brake system. In this way, an electronic brake system can advantageously be used for implementing the concept described.

This method can be implemented, for example, in software or hardware, or in a hybrid software/hardware form, for example in a control apparatus. The concept proposed here thus furthermore achieves a device which is configured for carrying out, actuating, or implementing, respectively, the steps of a variant of a method proposed here in corresponding installations.

A device herein can be understood to be an electrical apparatus which processes sensor signals and as a function thereof emits control and/or data signals. The device can have an interface which can be configured in terms of software and/or hardware. In the case of a configuration in terms of hardware, the interfaces can be part of a so-called system ASIC, for example, which includes highly varied functions of the device. However, it is also possible that the interfaces are dedicated integrated circuits, or at least in part are composed of discrete construction elements. In the case of a configuration in terms of software, the interfaces can be software modules which, apart from other software modules, are present in a microcontroller.

A corresponding device for controlling the ride level for a vehicle having at least one first axle having a first air suspension and/or one second axle having a second air suspension, a parking brake installation and an operating brake installation thus has suitable installations for carrying out the steps of the mentioned method for controlling the ride level.

The device herein can have a control apparatus of an electronic ride level control system for providing the ride level variation signal and a control apparatus of an electronic parking brake. The control apparatus of the electronic parking brake herein can be configured for reading the ride level variation signal by way of an interface to the control apparatus of the electronic ride level control system and for determining and providing the parking brake release signal while using the ride level variation signal.

The device can furthermore have a control apparatus of an electronic brake system, said control apparatus being configured for reading the ride level variation signal by way of an interface to the control apparatus of the electronic ride level control system and for determining and providing the operating brake engagement signal while using the ride level variation signal.

A corresponding vehicle having at least one first axle having a first air suspension and/or one second axle having a second air suspension, a parking brake installation, a parking brake valve configured for releasing and engaging the parking brake installation, an operating brake installation, can thus advantageously have a mentioned device for controlling the ride level. The device herein can be configured for providing the parking brake release signal to an interface to the parking brake valve, for providing the first control signal to interface to a first valve of the first air suspension, and for providing the second control signal to an interface to a second valve of the second air suspension.

Exemplary embodiments of the concept proposed here will be explained in more detail in the description hereunder with reference to the figures.

DETAILED DESCRIPTION

Figure 1:
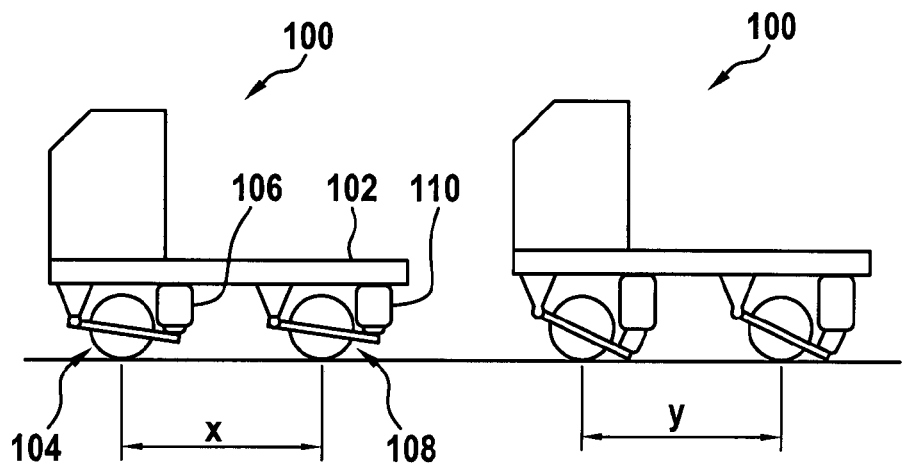
FIG. 1 shows a schematic illustration of a ride level control system of a vehicle, according to one exemplary embodiment.

FIG. 1 shows a schematic illustration of a vehicle 100 while carrying out controlling of the ride level according to one exemplary embodiment. The vehicle 100 in the left illustration is shown having a first body height, here a lower ride level, and the same vehicle 100 in the right illustration is shown having a second body height, here a higher ride level.

The vehicle 100 comprises a body 102 and in an exemplary manner a first axle 104 having an assigned first spring installation 106 and a second axle 108 having an assigned second spring installation 110. The spring installations 106, 110 are disposed between the body 102 and free ends of axle linkage bars. The ends of the axle linkage bars that are opposite the free ends are pivotably connected to the body 102 by way of bearings. The axle linkage bars are furthermore shaped for supporting axle shafts of the axles 104, 108.

In an exemplary manner, the first axle is the front axle and the second axle is the rear axle of the vehicle 100. According to one exemplary embodiment, the vehicle 100 comprises only one air-sprung axle. In this case, the concept described here can be applied in an analogous manner. For example, the method can also be applied to vehicles which at the front have a steel spring or any other suspension that deviates from an air suspension, and at the rear have an air suspension.

Suspension bellows of the spring installations 106, 110 are shown in an at least partially air-discharged state in the left illustration of the vehicle 100 such that a longitudinal extent of the suspension bellows is less than a maximum longitudinal extent. A low body height results therefrom.

The suspension bellows of the spring installations 106, 110 are shown in an at least partially air-discharged state in the right illustration of the vehicle 100 such that a longitudinal extent of the suspension bellows is greater than a minimum longitudinal extension. A high body height results therefrom.

A variation of the longitudinal extent of the suspension bellows of the spring installations 106, 110 leads to a variation of the position of the axle linkage bars and, on account thereof, to a variation of the spacing between the axles 104, 108. The spacing between the axles 104, 108 in the illustration of the vehicle 100 shown on the left has the value x, and in the illustration shown on the right the value y which differs from the value x.

When a variation of the body height in the vehicle 100 equipped with the air suspension 106, 110 also effects a variation of the spacing between the axles 104, 106, the variation of the body height can thus only be carried out when a parking brake of the vehicle 100 is either not activated or activated only in one axle group such that at least the wheels of one axle group can roll and the movement of the body 102 is not blocked.

Figure 2:
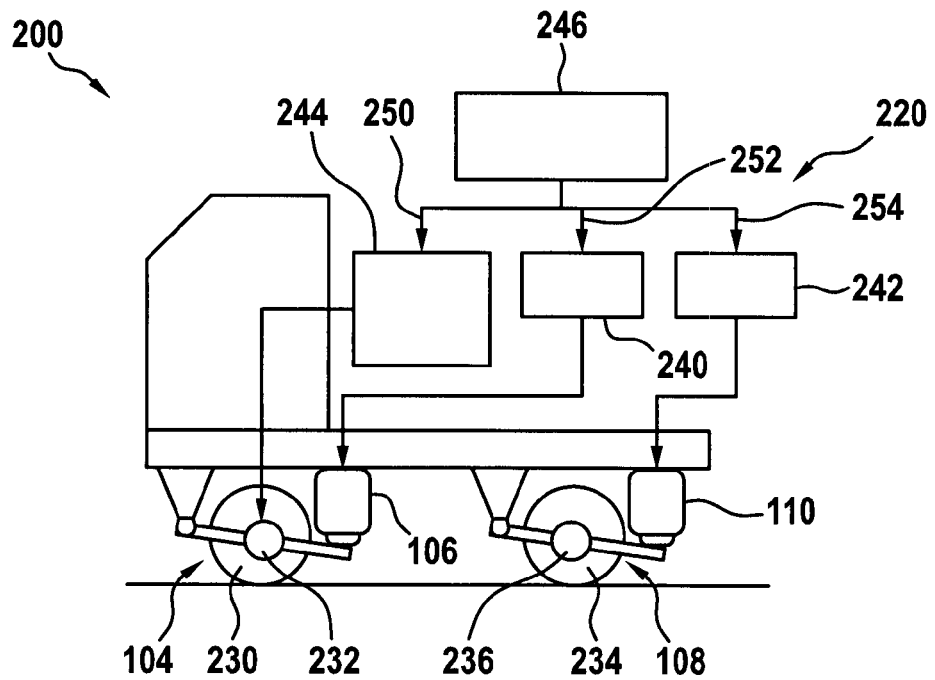
FIG. 2 shows a schematic illustration of a vehicle having a device for controlling the ride level.

FIG. 2 shows a schematic illustration of a vehicle 200 having a device 220 for controlling the ride level. As has been described by FIG. 1, the vehicle 200 has two axles 104, 106 having air suspensions 106, 110.

The first axle 104 comprises first wheels 230 and first parking and operating brakes 232. The second axle 106 comprises second wheels 234 and second parking and operating brakes 236.

The vehicle 200 comprises a first valve 240, here a front valve, for discharging and charging the first spring installation 106 with air, and a second valve 242, here a rear valve, for charging and discharging the second spring installation 110 with air. The vehicle 200 furthermore comprises a parking brake release valve 244 which is configured for releasing the parking brake 232. The valves 240, 242, 244 can be part of the device 220. The device 220 for controlling the ride level comprises a control apparatus 246 for electronically controlling the ride level, which provides a control signal 250 for controlling the valve 244 and control signals 252, 254 for controlling the valves 240, 242.

The parking brake of one axle 104, 106, here in an exemplary manner the front axle 104, can thus be released while using the separate valve 244 which is controlled by the control apparatus 246 which provides information pertaining to the ride level controlling activity.

According to one exemplary embodiment, the valves 240, 242 are part of the spring installations 106, 110.

Figure 3:
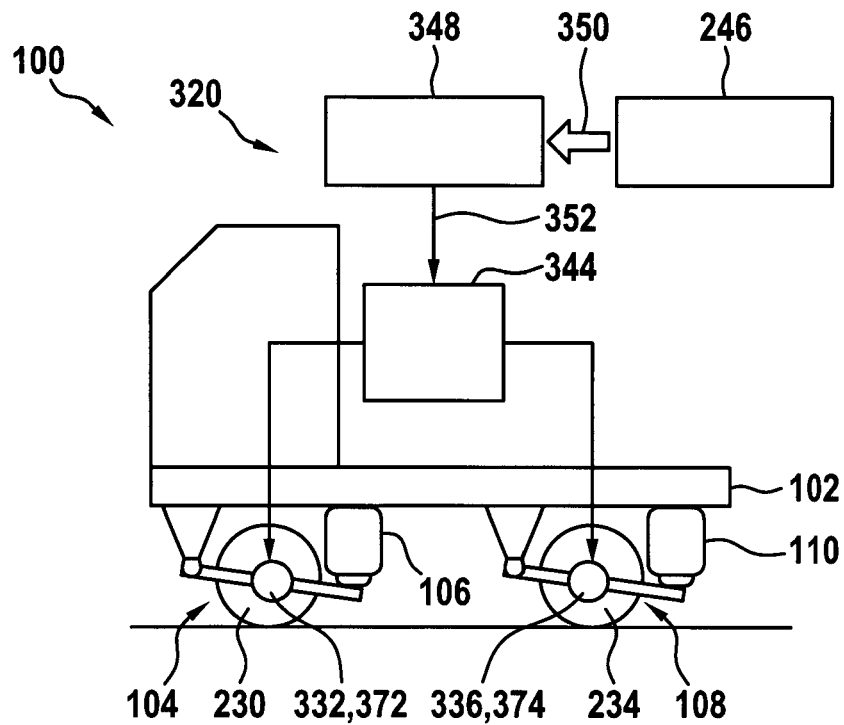
FIG. 3 shows a schematic illustration of a vehicle having a device for controlling the ride level, according to one embodiment.

FIG. 3 shows a schematic illustration of a vehicle 100 having a device 320 for controlling the ride level, according to one exemplary embodiment. As is described by FIG. 2, the vehicle 100 has two axles 104, 108 having air suspensions 106, 110. The first axle 104 comprises first wheels 230 and first parking brakes 332. The second axle 108 comprises second wheels 234 and second parking brakes 336. The vehicle 100 according to one exemplary embodiment furthermore comprises valves for charging and discharging air bellows of the spring installations 106, 110 with air, as is shown in FIG. 2. The vehicle 100 furthermore comprises operating brakes 372, 374, as is described in more detail hereunder by FIG. 4.

The vehicle 100 comprises a parking brake valve 344 which is configured for engaging and releasing the parking brakes 332, 336. By contrast to the vehicle shown by FIG. 2, the vehicle 100 does not have a separate parking brake release valve for releasing one of the parking brakes 332, 336. According to one exemplary embodiment, the valve 344 is part of the device 320.

The device 320 comprises a control apparatus 246 for electronically controlling the ride level, and a control apparatus 348 of an electronic parking brake. The control apparatuses 246, 348 are connected to one another by way of a suitable communications line or communications interface.

According to one exemplary embodiment, the control apparatus 246 is configured for providing a ride level variation signal 350 which comprises an item of information pertaining to a ride level variation of the body 102 of the vehicle 100 to be carried out while using the spring installations 106, 110. The control apparatus 348 according to this exemplary embodiment is configured for reading the ride level variation signal 350 and to use the latter for determining a parking brake release signal 352. For example, the control apparatus 348 is configured for determining the parking brake release signal 352 as soon as the ride level variation signal 350 is received. The control apparatus 348 is configured for providing the parking brake release signal 352 to the valve 344. The parking brake release signal 352 is suitable for actuating the valve 344 such that the parking brakes 332, 336 are released. On account thereof, the wheels 230, 234 are no longer blocked by the parking brakes 332, 336.

According to one exemplary embodiment, the control apparatus 246 is configured for providing control signals to valves of the air suspensions 106, 110 so as to carry out the variation in the ride level. For example, the control apparatus 246 is configured for providing the control signal after the parking brake release signal 352 or simultaneously therewith.

By contrast to FIG. 2, in the case of the exemplary embodiment described by FIG. 3, instead of having a separate valve, the function for releasing the parking brakes 332, 336 is integrated in the valve 344 which is responsible for activating or releasing the parking brake 332, 336.

According to one exemplary embodiment, the valve 344 is embodied as a single component. A single component can thus be used for engaging the parking brakes 332, 336 when the vehicle 100 is parked, and for releasing said parking brakes 332, 336 when the vehicle 100 is travelling, and on the other hand be used for releasing the parking brakes 332, 336 when the ride level variation is indicated by the ride level variation signal 350.

Figure 4:
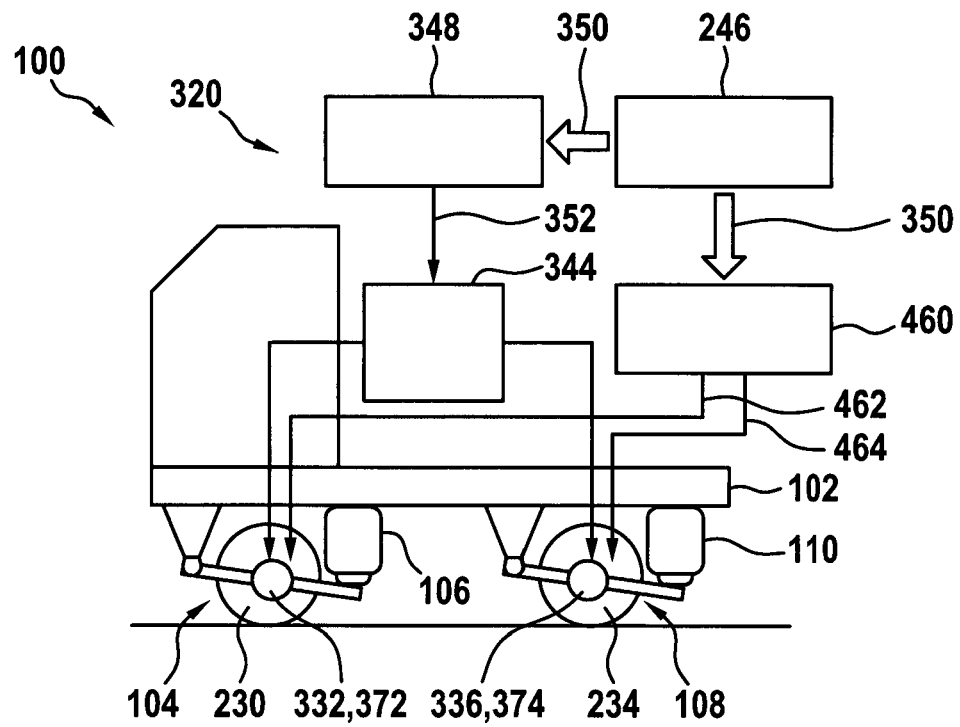
FIG. 4 shows a schematic illustration of a vehicle having a device for controlling the ride level, according to one exemplary embodiment.

FIG. 4 shows a schematic illustration of a vehicle 100 having a device 320 for controlling the ride level according to one exemplary embodiment. By contrast to the device shown in FIG. 3, the device 320 shown in FIG. 4 furthermore comprises a control apparatus 460 of an electronic brake system. The control apparatus 460 is configured for reading the ride level variation signal 350 or a corresponding signal by way of a suitable interface to the control apparatus 246 of the electronic ride level control system and for using said signal for determining at least one operating brake engagement signal 462, 464. According to one exemplary embodiment, the control apparatus 460 is configured for providing the operating brake engagement signal 462 to an operating brake 372 assigned to the first axle 104. The operating brake engagement signal 462 herein is configured for engaging the operating brake 372. According to one further exemplary embodiment, the control apparatus 460 additionally or alternatively is configured for providing the operating brake engagement signal 464 to an operating brake 374 assigned to the second axle 108. The operating brake engagement signal 464 herein is configured for engaging the operating brake 374.

For example, the control apparatus 460 is configured for providing at least one of the operating brake engagement signals 462, 464 simultaneously with the parking brake release signal 352 or after check testing with braking functions.

Instead of a separate valve as shown in FIG. 2, the ride level adjustment activity can be achieved by a combination of the electronic ride level control system (ELC), implemented by the control apparatus 246, of the electronic parking brake (EPB), implemented by the control apparatus 348, and of the electronic brake system (EBS), implemented by the control apparatus 460, in that the control apparatus 246 for electronically controlling the ride level by way of a communications interface informs the control apparatus 348 for the electronic parking brake and the control apparatus 460 of the electronic brake system that the ride level of the body 102 is to be adapted. Responding to this information which is transmitted by way of the ride level variation signal 350, for example, the control apparatus 348 of the electronic brake system is configured for releasing the parking brake 332, 336 on one or all axles 104, 108, for example by providing the parking brake release signal 352, on the one hand, and the control apparatus 460 of the electronic brake system is configured for braking at least one axle 104, 108 and permitting the other axles to roll, for example by providing one of the signals 462, 464, on the other hand.

Figure 5:
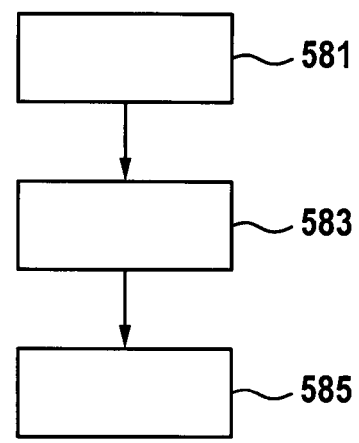
FIG. 5 shows a sequence diagram of a method for controlling the ride level, according to one exemplary embodiment.

FIG. 5 shows a sequence diagram of a method for controlling the ride level, according to one exemplary embodiment. The method can be carried out while using a device as is described by FIGS. 3 and 4, for example.

In a step 581, a ride level variation signal which indicates a ride level variation to be carried out is read. On account of the ride level variation the body is lifted, for example, as is shown by FIG. 1. In a step 583, a parking brake release signal is provided to an interface to a parking brake valve that is configured for releasing and engaging the parking brake installation. The provision herein takes place in a manner responding to the reading of the ride level variation signal. In a step 585, a first control signal is provided to interface to a first valve of the first air suspension and/or a second control signal is provided to an interface to a second valve of the second air suspension. The control signal or control signals herein are provided while using the ride level variation signal for carrying out the ride level variation indicated by the ride level variation signal.

The method is suitable for releasing a parking brake in a vehicle having an air suspension. According to one exemplary embodiment, an integration of the parking brake release into the electronic parking brake system takes place herein in the case of a command function for varying the body height. According to one further exemplary embodiment, a distribution of the parking brake release into the electronic height adjustment control system takes place in the case of a command function for varying the body height, and an operation of the brake and parking brake control apparatuses takes place such that, in the case of the electronic ride level control system (ELC) attempting to vary the body height, the electronic ride level control system (ELC) informs the electronic parking brake (EPB) so that the electronic parking brake (EPB) releases the parking brake and informs the electronic brake system (EBS) so that the electronic brake system (EBS) activates the operating brakes on at least one axle.

LIST OF REFERENCE SIGNS

100 Vehicle
104 First axle
106 First air suspension
108 Second axle
110 Second air suspension
200 Vehicle
220 Device for controlling the ride level
230 First wheel
232 First parking and operating brake
234 Second wheel
236 Second parking and operating brake
240 First valve
242 Second valve
244 Parking brake release valve
246 Control apparatus for electronically controlling the ride level
250 Control signal
252 Control signal
254 Control signal
320 Device for controlling the ride level
332 First parking brake
336 Second parking brake
344 Parking brake release valve
348 Control apparatus of an electronic parking brake
350 Ride level variation signal
352 Parking brake release signal
372 First operating brake
374 Second operating brake
460 Control apparatus of an electronic brake system
462 First operating brake engagement signal
464 Second operating brake engagement signal
581 Step of reading
583 Step of providing
585 Step or providing

The invention claimed is:

1. A method for controlling a ride level for a vehicle having at least one first axle having a first air suspension and/or one second axle having a second air suspension, a parking brake installation and an operating brake installation, the method comprising:
reading a ride level variation signal which indicates a ride level variation to be carried out;
providing a parking brake release signal to an interface to a parking brake valve that, responding to the ride level variation signal, is configured for releasing and engaging the parking brake installation, wherein the parking brake release signal is configured for actuating the parking brake valve for releasing the parking brake installation; and
providing a first control signal to an interface to a first valve of the first air suspension and/or a second control signal to an interface to a second valve of the second air suspension while using the ride level variation signal for carrying out the ride level variation;
wherein the operating brake engagement signal is provided while using a control apparatus of an electronic brake system.

2. The method of claim 1, wherein the reading in of the ride level variation signal takes place by an interface to a control apparatus of an electronic ride level control system.

3. The method of claim 1, wherein the parking brake release signal is provided while using a control apparatus of an electronic parking brake.

4. A method for controlling a ride level for a vehicle having at least one first axle having a first air suspension and/or one second axle having a second air suspension, a parking brake installation and an operating brake installation, the method comprising:
reading a ride level variation signal which indicates a ride level variation to be carried out;
providing a parking brake release signal to an interface to a parking brake valve that, responding to the ride level variation signal, is configured for releasing and engaging the parking brake installation, wherein the parking brake release signal is configured for actuating the parking brake valve for releasing the parking brake installation;
providing a first control signal to an interface to a first valve of the first air suspension and/or a second control signal to an interface to a second valve of the second air suspension while using the ride level variation signal for carrying out the ride level variation; and
providing an operating brake engagement signal to an interface to the operating brake installation responding to the ride level variation signal, wherein the operating brake engagement signal is configured for effecting an engagement of an operating brake of the operating brake installation that is assigned to the first axle and/or to the second axle.

5. An apparatus for controlling a ride level for a vehicle having at least one first axle having a first air suspension and/or one second axle having a second air suspension, a parking brake installation and an operating brake installation, comprising:
a device configured to perform the following:
reading a ride level variation signal which indicates a ride level variation to be carried out;
providing a parking brake release signal to an interface to a parking brake valve that, responding to the ride level variation signal, is configured for releasing and engaging the parking brake installation, wherein the parking brake release signal is configured for actuating the parking brake valve for releasing the parking brake installation; and
providing a first control signal to an interface to a first valve of the first air suspension and/or a second control signal to an interface to a second valve of the second air suspension while using the ride level variation signal for carrying out the ride level variation;
a control apparatus of an electronic ride level control system for providing the ride level variation signal and a control apparatus of an electronic parking brake, wherein the control apparatus is configured for reading the ride level variation signal by an interface to the control apparatus of the electronic ride level control system and for determining and providing the parking brake release signal while using the ride level variation signal; and a control apparatus of an electronic brake system, wherein the control apparatus is configured for reading the ride level variation signal by an interface to the control apparatus of the electronic ride level control system and for determining and providing the operating brake engagement signal while using the ride level variation signal.

6. A vehicle, comprising:

at least one first axle having a first air suspension and/or one second axle having one second air suspension;

a parking brake installation;

a parking brake valve for releasing and engaging the parking brake installation;

an operating brake installation; and a device for controlling the ride level, wherein the device is configured to perform the following:

reading a ride level variation signal which indicates a ride level variation to be carried out;

providing a parking brake release signal to an interface to a parking brake valve that, responding to the ride level variation signal, is configured for releasing and engaging the parking brake installation, wherein the parking brake release signal is configured for actuating the parking brake valve for releasing the parking brake installation; and providing a first control signal to an interface to a first valve of the first air suspension and/or a second control signal to an interface to a second valve of the second air suspension while using the ride level variation signal for carrying out the ride level variation;

wherein the device is configured for providing the parking brake release signal to the interface to the parking brake valve, for providing the first control signal to interface to the first valve of the first air suspension and/or for providing the second control signal to the interface to the second valve of the second air suspension;

wherein the operating brake engagement signal is provided while using a control apparatus of an electronic brake system.

* * * * *